(12) United States Patent
Marom et al.

(10) Patent No.: US 12,314,776 B2
(45) Date of Patent: May 27, 2025

(54) MAPPING LOGICAL PARTITIONS FOR EVENT DATA TO A PLURALITY OF QUEUES

(71) Applicant: Microsoft Technology Licensing, LLC, Redmond, WA (US)

(72) Inventors: Raz Marom, Haifa (IL); Dror Cohen, Tel Aviv (IL); Jonatan Zukerman, Matan (IL)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 593 days.

(21) Appl. No.: 17/699,814

(22) Filed: Mar. 21, 2022

(65) Prior Publication Data

US 2023/0297439 A1    Sep. 21, 2023

(51) Int. Cl.
*G06F 9/50* (2006.01)

(52) U.S. Cl.
CPC ............ *G06F 9/5077* (2013.01); *G06F 9/505* (2013.01)

(58) Field of Classification Search
CPC ....... G06F 9/5077; G06F 9/505; G06F 9/5083
See application file for complete search history.

(56) References Cited

U.S. PATENT DOCUMENTS

| | | | |
|---|---|---|---|
| 9,578,120 B1 * | 2/2017 | Evenson | H04L 67/55 |
| 10,313,219 B1 * | 6/2019 | Burcham | H04W 24/02 |
| 10,901,819 B1 * | 1/2021 | Dayan | G06F 9/542 |
| 2012/0151472 A1 * | 6/2012 | Koch | G06F 9/45558 718/1 |
| 2013/0066674 A1 * | 3/2013 | Vasters | G06Q 40/04 705/7.29 |
| 2016/0357778 A1 * | 12/2016 | MacKenzie | G06F 13/36 |
| 2017/0329633 A1 * | 11/2017 | Hsu | G06F 9/50 |
| 2018/0285021 A1 * | 10/2018 | Akaike | G06F 3/0656 |
| 2019/0012218 A1 * | 1/2019 | Rimac | G06F 9/4881 |
| 2020/0120541 A1 * | 4/2020 | Wang | H04L 67/60 |
| 2022/0167469 A1 * | 5/2022 | Bequet | G06F 9/4881 |
| 2022/0300312 A1 * | 9/2022 | Huss | G06F 9/5027 |

* cited by examiner

*Primary Examiner* — Dong U Kim

(57) ABSTRACT

According to examples, an apparatus may include a processor and a memory on which are stored machine-readable instructions that, when executed by the processor, may cause the processor to receive event data to be placed in a plurality of queues. The processor may determine logical partitions for the received event data and may store the event data in the plurality of queues based on the determined logical partitions. A first queue of the plurality of queues may be mapped to a first logical partition range and a second queue of the plurality of queues may be mapped to a second logical partition range. Based on respective loads at the plurality of queues, the processor may update a mapping of the determined logical partitions to the plurality of queues by transferring logical partitions between the first queue and the second queue.

20 Claims, 4 Drawing Sheets

MAPPING LOGICAL PARTITIONS FOR EVENT DATA TO A PLURALITY OF QUEUES

BACKGROUND

Computing devices may receive event data from data sources and may provide various types of services based on the event data. The event data may be stored in a plurality of queues based on some feature of the event data, such as a user identifier included in the event data. For instance, all of the event data including a first source user identifier may be stored in a first queue, all of the event data including a second source user identifier may be stored in a second queue, and so forth. Readers of the event data may retrieve the event data from the queues, for instance, according to a first-in first-out retrieval scheme.

BRIEF DESCRIPTION OF THE DRAWINGS

Features of the present disclosure are illustrated by way of example and not limited in the following figure(s), in which like numerals indicate like elements, in which.

DETAILED DESCRIPTION

Figure 1:
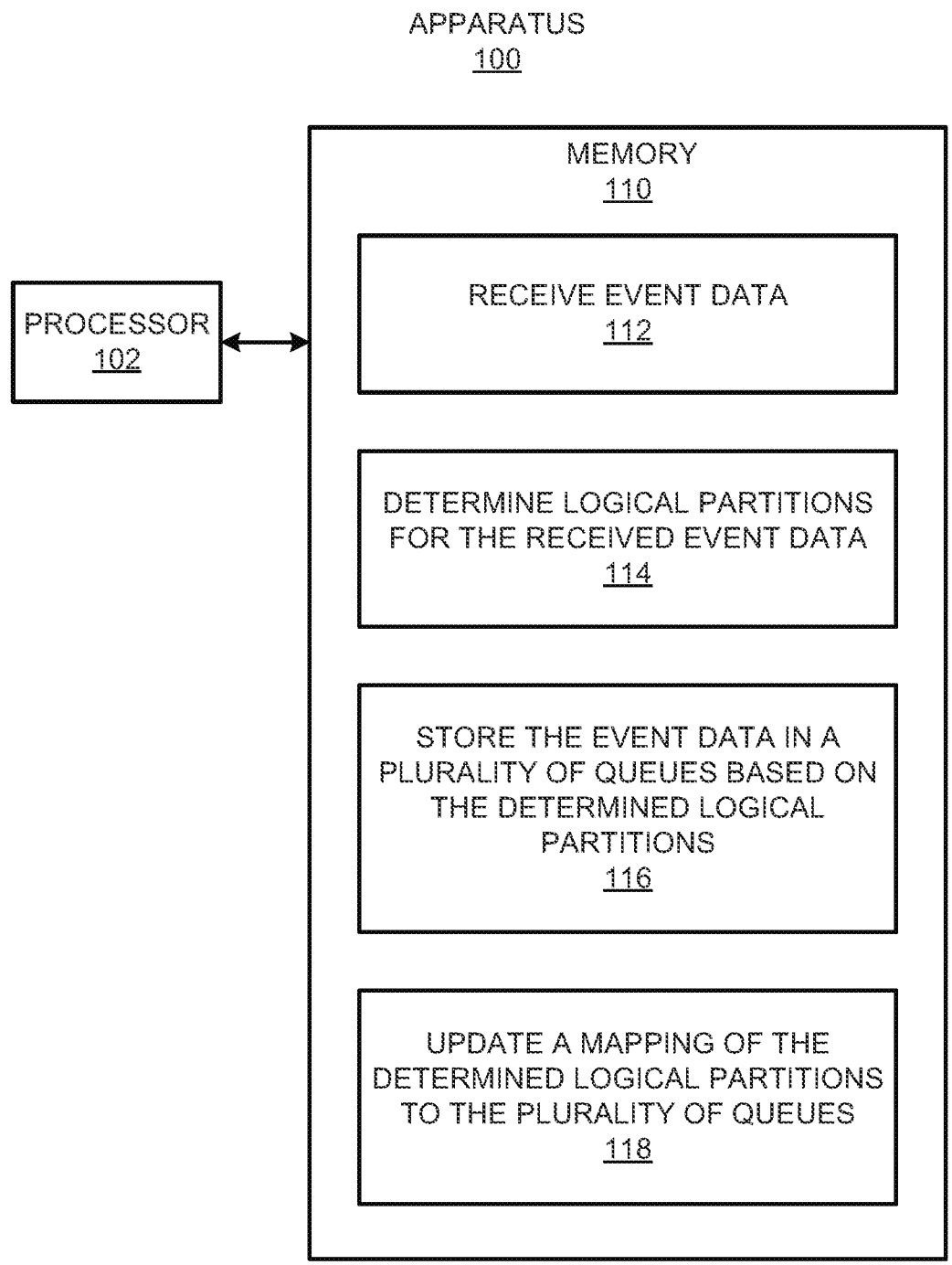
FIG. 1 depicts a block diagram of an apparatus that may determine logical partitions for event data and store the event data in a plurality of queues based on the determined logical partitions, in accordance with an embodiment of the present disclosure.

For simplicity and illustrative purposes, the principles of the present disclosure are described by referring mainly to embodiments and examples thereof. In the following description, numerous specific details are set forth in order to provide an understanding of the embodiments and examples. It will be apparent, however, to one of ordinary skill in the art, that the embodiments and examples may be practiced without limitation to these specific details. In some instances, well known methods and/or structures have not been described in detail so as not to unnecessarily obscure the description of the embodiments and examples. Furthermore, the embodiments and examples may be used together in various combinations.

Throughout the present disclosure, the terms "a" and "an" are intended to denote at least one of a particular element. As used herein, the term "includes" means includes but not limited to, the term "including" means including but not limited to. The term "based on" means based at least in part on.

A computing device may receive event data and may store the received event data in a plurality of queues. Various readers may access the plurality of queues to retrieve the event data stored in the plurality of queues. The readers may retrieve the event data according to a first-in first-out retrieval scheme from the queues. The readers may also retrieve the event data from the queues in a round robin retrieval scheme or a similar type of retrieval scheme.

The event data may include any of a number of types of data that data sources may collect. The event data may include logs and flow data, such as antivirus events, firewall logs, and/or the like, from users, applications, assets, cloud environments, networks, and/or the like. The event data may include, for instance, data that may be used for security purposes, data collection purposes, data analytics, and/or the like. By way of particular example, cloud-based security information and event management (SIEM) services may receive relatively large amounts of event data, and may process the received event data to provide services, such as security analytics and event management services. In some examples, the incoming event data may be partitioned based on a feature of the event data. In addition, the event data may be placed in a plurality of queues based on the partitioning of the event data. For instance, event data having a first feature may be stored in a first queue, event data having a second feature may be stored in a second queue, and so forth.

A concern associated with partitioning the event data and storing them in a plurality of queues may be that the event data may not be evenly distributed among the plurality of queues. In other words, greater numbers of event data may be stored on some of the queues than other ones of the queues. This may result in the reading of the event data stored in the queues with the greater numbers of event data to be delayed with respect to the reading of the event data stored in the queues with the lesser numbers of event data.

By way of particular example to illustrate such issues, a computing device may receive event data, such as user activity events, from a data source. The computing device may use a certain field in the received event data, such as a user identification (a user ID) field, as a partition key to partition the user activity events for distribution of the event data across the plurality of queues. However, in such instances, the activity load of different users may not be equal to each other. For instance, certain users may tend to be more active and produce relatively more event data than other users. As such, when the event data are partitioned for storage into the queues, a greater number of the event data of the more active users may be partitioned for storage into a certain set of queues. Likewise, a smaller number of the event data of the less active users may be partitioned for storage into another certain set of queues. This may result in some of the queues having a greater load due to the greater number of event data than other ones of the queues.

As a result, the loads may not be evenly or uniformly distributed across the queues. The uneven distribution of the loads may result in bottlenecks with respect to the reading of the event data from the queues. That is, the reading of the event data of the more active users may be delayed as compared with the reading of the event data of the less active users. A technical issue with the delayed reading of the event data may be that the detection of events, such as malicious events, may be delayed, which may increase damage caused by the events. That is, the delayed reading and thus, delayed analysis, of the event data may result in harm to devices in a network, such as the spread of malicious software. In addition, the uneven distribution of the queues may cause the reader services that read from the queues having the larger numbers of event data to be overloaded, which may result in inefficient operations of the reader services.

Disclosed herein are apparatuses, systems, methods, and computer-readable media that may enable efficient allocation of event data and improved distribution of load among a plurality of queues. As disclosed herein, a processor may receive event data to be placed in the plurality of queues. The event data may be placed in the plurality of queues while the event data waits to be read, processed, analyzed, or the like. The processor may determine logical partitions for the received event data and store the event data in the plurality of queues based on the determined logical partitions. In some examples, the processor may map a first logical partition range to a first queue of the plurality of queues and may map a second logical partition range to a second queue of the plurality of queues. Based on respective loads at the plurality of queues, the processor may update the mapping of the determined logical partitions to the plurality of queues by transferring the mapping of at least one of the determined logical partitions between the first queue and the second queue to increase a balance of load across the plurality of queues.

Through implementation of the features of the present disclosure, a processor may enable greater granularity of the event data for partitioning, which may enable improved load distribution across the plurality of queues. The improved load distribution may reduce bottlenecks and latency in reading the event data from the plurality of queues. A technical improvement afforded through implementation of the features of the present disclosure may be that delays in the reading of the event data from the plurality of queues may be reduced. By reducing the delays in reading of the event data, the speed at which potentially malicious events and/or other potentially abnormal events may be identified, such as by SIEM services, may be improved. This may reduce harm caused by the potentially malicious events, which may improve security on the devices on a network where the event data is collected. The improved load distribution amongst the queues may also result in improved load balancing among the reader services that read the event data from the queues, which may cause the reader services to have improved functionality and to operate efficiently.

Figure 2:
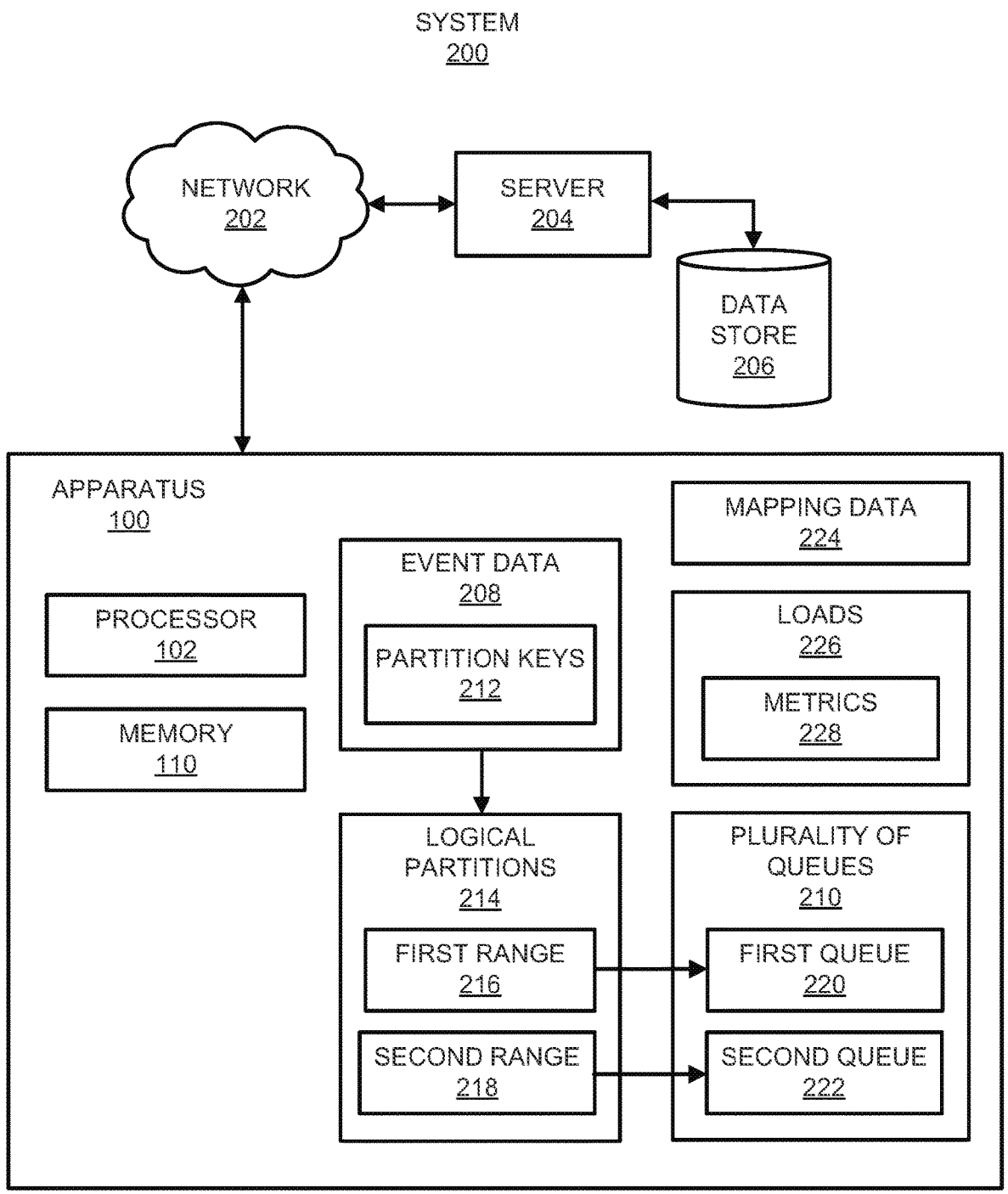
FIG. 2 depicts a block diagram of a system within which the apparatus depicted in FIG. 1 may be implemented, in accordance with an embodiment of the present disclosure.

Reference is made to FIGS. 1 and 2. FIG. 1 shows a block diagram of an apparatus 100 that may determine logical partitions for event data and store the event data in a plurality of queues based on the determined logical partitions, in accordance with an embodiment of the present disclosure. FIG. 2 shows a block diagram of an example system 200 that may include the apparatus 100 depicted in FIG. 1, in accordance with an embodiment of the present disclosure. It should be understood that the apparatus 100 depicted in FIG. 1 and the system 200 depicted in FIG. 2 may include additional features and that some of the features described herein may be removed and/or modified without departing from the scopes of the apparatus 100 and/or the system 200.

The apparatus 100 may include a processor 102 and a memory 110. The apparatus 100 may be a computing device, including a server, a node in a network (such as a data center or a cloud computing resource), a desktop computer, a laptop computer, a tablet computer, a smartphone, an electronic device such as Internet of Things (IoT) device, and/or the like. The processor 102 may include a semiconductor-based microprocessor, a central processing unit (CPU), an application-specific integrated circuit (ASIC), a field-programmable gate array (FPGA), and/or other hardware device. In some examples, the apparatus 100 may include multiple processors and/or cores without departing from a scope of the apparatus. In this regard, references to a single processor as well as to a single memory may be understood to additionally or alternatively pertain to multiple processors and multiple memories.

The memory 110 may be an electronic, magnetic, optical, or other physical storage device that contains or stores executable instructions. The memory 110 may be, for example, Read Only Memory (ROM), flash memory, solid state drive, Random Access memory (RAM), an Electrically Erasable Programmable Read-Only Memory (EEPROM), a storage device, an optical disc, or the like. The memory 110 may be a non-transitory computer-readable medium. The term "non-transitory" does not encompass transitory propagating signals.

As shown in FIG. 1, the processor 102 may execute instructions 112-118, which may be machine-readable instructions, e.g., non-transitory computer-readable instructions. In other examples, the apparatus 100 may include hardware logic blocks or a combination of instructions and hardware logic blocks to implement or execute functions corresponding to the instructions 112-118.

The apparatus 100 may be connected via a network 202, which may be the Internet, a local area network, and/or the like, to a server 204. In addition, a data store 206 may be connected to the server 204.

The processor 102 may fetch, decode, and execute the instructions 112 to receive event data 208. In some examples, the server 204 may maintain data sources (not shown) for the event data 208 and may receive the event data 208 from the data sources. The data sources may be cloud-based data warehouses, data centers, and/or the like, which the server 204 or multiple servers 204 may access. The processor 102 may place the event data 208 in a plurality of queues 210, for instance, to be accessed by event readers (not shown).

The processor 102 may fetch, decode, and execute the instructions 114 to determine logical partitions 214 for the event data 208. In some examples, the event data 208 may include partition keys 212 that the processor 102 may use to determine the logical partitions 214. The processor 102 may identify the partition keys 212 in respective fields of the received event data 208. The partition keys 212 may be based on any of various types of data included in the received event data 208. By way of particular example, the processor 102 may apply user IDs stored in a user ID field of the event data 208 as the partition keys 212.

In some examples, the user IDs may include a string of alphanumeric characters and the processor 102 may calculate, for each of the event data 208, a hash of the alphanumeric characters of the user ID using a hash function. In addition, based on the calculated hash, the processor 102 may determine the respective logical partitions 214 for the received event data 208. In some examples, based on the calculated hashes, the processor 102 may apply a modulus function to a number of available logical partitions 214 to evenly distribute the event data 208 across the logical partitions 214.

In some examples, the number of logical partitions 214 may be set based on a predefined level of granularity of the event data 208 to be mapped to the plurality of queues 210. For instance, each of the plurality of queues 210 may be assigned to a certain logical partition range. As such, a relatively large number of logical partitions 214, compared to a number of the plurality of queues 210, may result in a greater level of granularity of the partitioned event data 208. In some examples, the number of logical partitions 214 may be set to be significantly greater than the number of the plurality of queues 210 to enable an increased level of granularity in the logical partitions 214 mapped across the plurality of queues 210.

In some examples, an upper threshold value may be set for the number of logical partitions 214 to be created. For instance, the number of logical partitions 214 may be set to be proportional to or less than a number of partition keys 212. The upper threshold value may be set because a relatively large number of logical partitions 214 compared to the number of partition keys 212 may potentially result in empty logical partitions 214. In addition, the predefined number of logical partitions 214 may be determined through testing, developer knowledge, modeling, real-world determinations, and/or the like.

By way of particular example and for purposes of illustration, a computing device may include 100 queues 210 for storing received event data 208. In view of the 100 available queues 210, the number of logical partitions 214 to provide a relatively high level of granularity across the 100 queues 210 may be set to, for instance, 1,000 logical partitions 214, which is an order of magnitude greater than the number of queues 210. In some examples, the processor 102 may determine the logical partitions 214 based on partition keys 212, for instance, the user IDs included in the event data 208. The number of logical partitions 214 may be set to be proportional to, or less than, a number of the partition keys 212, for instance, to avoid potential empty logical partitions 214.

The processor 102 may fetch, decode, and execute the instructions 116 to store the event data 208 in the plurality of queues 210 based on the determined logical partitions 214. In some examples, each of the plurality of queues 210 may store the event data 208 corresponding to certain ranges of the logical partitions 214. The processor 102 may map the logical partitions 214 to the plurality of queues 210 for storage of the event data 208.

In some examples, the processor 102 may group the logical partitions 214 into a plurality of logical partition ranges. A first logical partition range 216 and a second logical partition range 218 are depicted in FIG. 2 for purposes of illustration. It should, however, be understood that the logical partitions 214 may be grouped into any suitable number of ranges. In this regard, particular references to the first logical partition range 216 and the second logical partition range 218 should be understood as being applicable to other logical partition ranges. The processor 102 may allocate a predefined number of logical partitions 214 to each of the first logical partition range 216 and the second logical partition range 218. In some examples, during an initialization stage, the processor 102 may evenly distribute the logical partitions 214 to the plurality of logical partition ranges, for instance, such that the first logical partition range 216 may have the same number of logical partitions 214 as the second logical partition range 218.

The processor 102 may map the logical partition ranges 216, 218 to a plurality of queues 210. For instance, the processor 102 may map the first logical partition range 216 to a first queue 220 of the plurality of queues 210. In addition, the processor 102 may map the second logical partition range 218 to a second queue 222 of the plurality of queues 210. In some examples, the first logical partition range 216 may be correlated to a first number of the determined logical partitions 214 assigned to the first queue 220. Additionally, the second logical partition range 218 may be correlated to a second number of the determined logical partitions 214 assigned to the second queue 222. During the initialization stage, the processor 102 may evenly distribute the logical partition ranges 216, 218 across the plurality of queues 210. For instance, the processor 102 may map the logical partition ranges 216, 218 to the plurality of queues 210 such that each of the queues 210 is responsible for a certain one of the logical partition ranges 214, 216. As discussed herein, the processor 102 may initially set the logical partition ranges 216, 218 to each include the same number of logical partitions 214 with respect to each other.

The processor 102 may fetch, decode, and execute the instructions 118 to update the mapping of the determined logical partitions 214 to the plurality of queues 210. The processor 102 may update the mapping of the determined logical partitions 214 to the plurality of queues 210 by transferring the mapping of at least one of the determined logical partitions 214 between the first queue 220 and the second queue 222 (as well as between other queues in the plurality of queues 210) to increase a balance of load across the plurality of queues 210. By way of particular example in which the first queue 220 has a significantly larger number of event data 208 stored thereon, e.g., has a significantly larger load, than the second queue 222, the processor 102 may update the mapping such that responsibility of at least one of the logical partitions 214 is transferred from the first queue 220 to the second queue 222.

In some examples, the processor 102 may execute the mapping update by changing the mapping of the at least one logical partition 214 from the first queue 220 to the second queue 222. In some examples, the processor 102 may execute the mapping update by modifying the logical partitions 214 assigned to the logical partition ranges 216, 218. That is, for instance, the processor 102 may move at least one of the logical partitions 214 assigned to the first logical partition range 216 to the second logical partition range 218.

In some examples, the processor 102 may iteratively update the mapping of the determined logical partitions 214 to the plurality of queues 210 as the loads on the plurality of queues 210 may change over time. For instance, the processor 102 may iteratively update the mapping based on expiration of a predefined period of time, according to a certain schedule, based on the occurrence of certain events, and/or the like. The processor 102 may continue to iteratively update the mapping of the logical partitions 214, which may incrementally change the mapping of the logical partitions 214 across the plurality of queues 210, until a convergence is reached, in which case the loads across the plurality of queues 210 may substantially be balanced overtime.

The processor 102 may store the updated mapping information in mapping data 224. The mapping data 224 may include information to map the respective logical partitions 214 (or, equivalently, the logical partition ranges) to each of the plurality of queues 210. For instance, the mapping data 224 may include information on the first logical partition range 216, a number of the logical partitions 214 correlated to the first logical partition range 216, an identification of each of the logical partitions 214 correlated to the first logical partition range 216, an identification of the first queue 220 among the plurality of queues 210 to which the first logical partition range 216 is mapped, and/or the like. The processor 102 may store the mapping data 224 in the memory 110, the server 204, the data store 206 connected to the server 204, and/or the like.

In some examples, the processor 102 may update the mapping by transferring the mapping of at least one of the determined logical partitions 214 between the first queue 220 and the second queue 222. For instance, the processor 102 may update the mapping data 224, which may initially be stored during the initialization stage, to transfer a certain number of logical partitions 214 between the first logical partition range 216 and the second logical partition range 218. In this instance, due to the transfer of the logical partitions 214, the first number of the logical partitions 214 correlated to the first logical partition range 216 may be different than the second number of the logical partitions 214 correlated to the second logical partition range 218.

The processor 102 may update the mapping based on respective loads 226 at the plurality of queues 210. In some examples, the processor 102 may determine a load 226 at the first queue 220 among the plurality of queues 210. The processor 102 may determine the load 226 at the first queue 220 based on metrics 228 correlated to the first queue 220. The processor 102 may also determine the loads 226 on the other queues 210 based on metrics 228 correlated to the other queues 210.

In some examples, a predefined set of metrics 228 may be created for each of the plurality of queues 210. The predefined set of metrics 228 may be created and stored during the initialization stage, for instance, together with the mapping data 224. The predefined set of metrics 228 may be used to measure statistical characteristics, which may represent the loads 226 at each of the plurality of queues 210. In some examples, the processor 102 may calculate the predefined set of metrics 228 per each of the plurality of queues 210.

In some examples, the predefined set of metrics 228 may include an event ingress rate, a bytes ingress rate, an average de-queue time, and/or the like. The event ingress rate may represent a total number of events written to a certain queue 210 per second. In some examples, the period for the event ingress rate may be configurable. The bytes ingress rate may represent a data size for events written to a certain queue 210 per second. The average de-queue time may represent a rate of reading data from a certain queue 210. In some examples, the average de-queue time may be an average amount of time for a reader instance to pull an event from a certain queue 210.

Based on the predefined set of metrics 228, the processor 102 may measure the statistical characteristics that represents the loads 226 associated with the plurality of queues 210. By way of particular example and for purposes of illustration, the processor 102 may measure, for each of the plurality of queues 210, an event ingress rate in a predefined time window. The processor 102 may measure a mean, median, standard deviation, and/or the like, of the event ingress rate values across all of the plurality of queues 210. In some examples, the processor 102 may measure, for each of the plurality of queues 210, a relative event ingress rate in comparison to all of the other queues 210.

In some examples, the processor 102 may determine that the load 226 at the first queue 220 is greater than a predefined threshold value. Continuing with the above example in which the measured metric is the event ingress rate, the processor 102 may determine that the first queue 220 is busy when the event ingress rate at the first queue 220 is greater than the predefined threshold rate, for instance, greater than at least 2 standard deviations from a mean of event ingress rates at all of the plurality of queues 210. The predefined threshold value may be based on the metric values of the plurality of queues 210, may be user-defined, may be based on testing, may be based on modeling, and/or the like.

Based on a determination that the load 226 at the first queue 220 is greater than the predefined threshold value, the processor 102 may update the mapping of the determined logical partitions 214 for the first queue 220 to decrease a number of logical partitions 214 mapped to the first queue 220. In addition, the processor 102 may update the mapping of the determined logical partitions 214 for the second queue 222 to increase a number of logical partitions 214 mapped to the second queue 222. In some examples, the increase in the number of logical partitions 214 mapped to the second queue 222 may be equivalent to the decrease in the number of logical partitions 214 mapped to the first queue 220. As a result, the load at the first queue 220 may be correlated to the logical partitions 214 to be removed and the load at the second queue 222 may be correlated to the logical partitions 214 may be increased.

In some examples, based on a determination that the first queue 220 is busy, e.g., the load on the first queue 220 exceeds the predefined threshold value, the processor 102 may determine an amount of load to be transferred out of the first queue 220. For instance, the processor 102 may determine a number of logical partitions 214 to be transferred out of the first queue 220. In order to transfer the determined number of logical partitions 214 out of the first queue 220, the processor 102 may remove correlations between the determined number of logical partitions 214 to be transferred and the first logical partition range 216 mapped to the first queue 220. In some examples, the processor 102 may determine the number of logical partitions 214 to be transferred out of the first queue 220 based on, for instance, a predefined number of logical partitions 214, a predefined fraction of the logical partitions 214 mapped to the first queue 220, and/or the like.

In some examples, the processor 102 may randomly select the number of the logical partitions 214 to be transferred. For instance, the processor 102 may calculate a probability of each logical partition 214 mapped to the first queue 220 to be transferred to another queue among the plurality of queues 210. By way of particular example, the processor 102 may calculate the probability of transfer based on the event ingress rate at the first queue 220 relative to the event ingress rates at all of the plurality of queues 210. The processor 102 may select the number of logical partitions 214 to be transferred based on the calculated probability, for instance, relative to the predefined threshold value. In this example, the calculated probability may increase with a correlated increase in load 226 at the first queue 220, and as such, the processor 102 may select a relatively greater number of logical partitions 214 to be transferred in response to an increase in the calculated probability of transfer.

In some examples, the processor 102 may determine a destination queue among the plurality queues 210, for instance a non-busy queue such as the second queue 222, for transferring the logical partitions 214. The processor 102 may determine the load 226 at the plurality of queues 210 to identify the non-busy queues in the same manner as described previously with respect to determining the load 226 at the first queue 220. In some examples, the processor 102 may measure statistical characteristics for each of the plurality of queues 210 based on the predefined set of metrics 228 to determine the load 226 at each of the plurality of queues 210.

For instance, the processor 102 may identify the second queue 222 as a non-busy queue in a case in which a measured metric 228 for the second queue 222 is less than a second predefined threshold value. The second predefined threshold value may be based on the metric values of the plurality of queues 210, may be user-defined, may be based on testing, may be based on modeling, and/or the like. The second predefined threshold value may also be lower than the predefined threshold value such that a range of buffer values may be provided between the predefined threshold value and the second predefined threshold value.

By way of particular example, the processor 102 may determine the second queue 222 to be a non-busy queue, e.g., has a load that is below the second predefined threshold value, in a case in which the event ingress rate of the second queue 222 is less than the median ingress rate of all of the plurality of queues 210. In some examples, the number of logical partitions 214 to be transferred from the first queue 220 to the second queue 222 may be based on a level of the load 226 at the second queue 222, for instance, such that a greater amount of load 226 may be transferred from the first queue 220 to the second queue 222 based on a relatively greater available capacity at the second queue 222. In some examples, the number of logical partitions 214 to be transferred from the first queue 220 to the second queue 222 may be based on a predefined number of logical partitions 214. In this instance, the processor 102 may execute multiple iterations of the mapping update to incrementally balance the loads 226, each of the iterations to transfer the predefined number of logical partitions 214, until a convergence in the level of loads 226 is reached across the plurality of queues 210.

In some examples, based on a determination that the load at the first queue 220 is less than the second predefined threshold value, the processor 102 may update the mapping of the determined logical partitions 214 for the first queue 220 to increase the number of logical partitions 214 mapped to the first queue 220.

Figure 3:
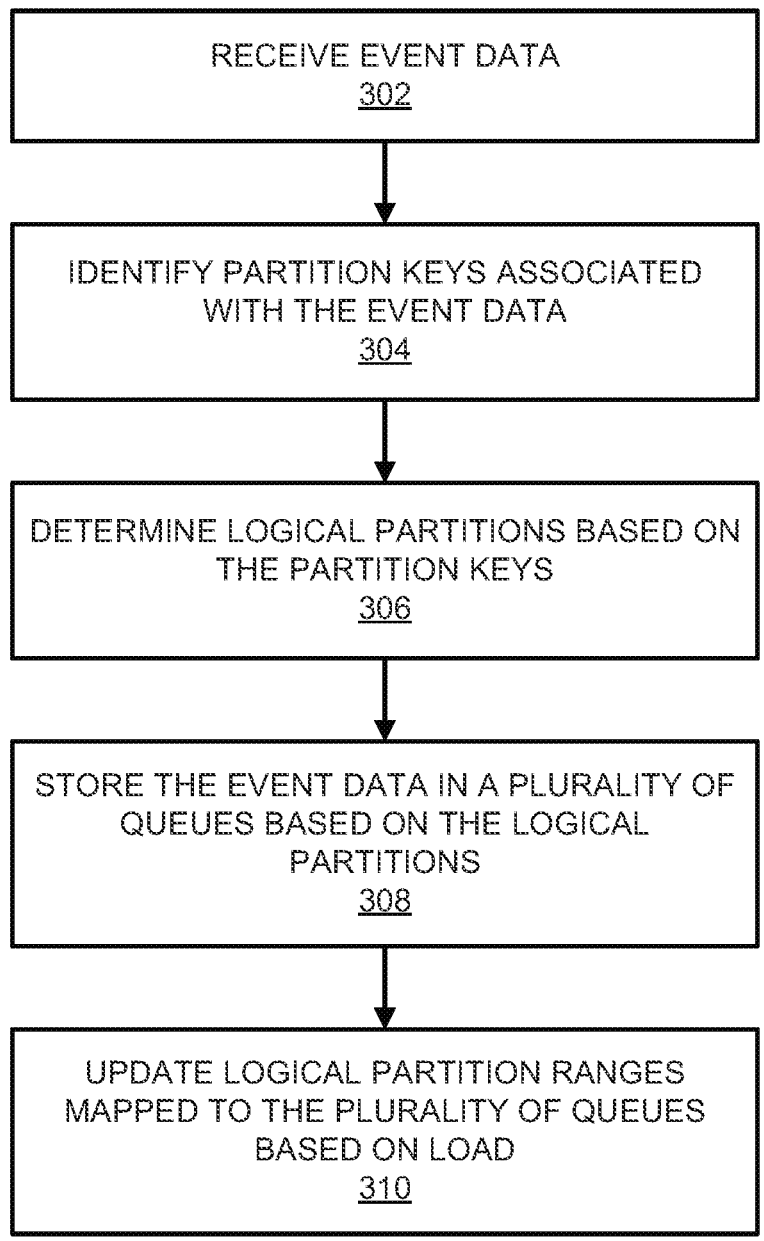
FIG. 3 depicts a flow diagram of a method for determining logical partitions for event data based on partition keys, storing the event data in a plurality queues based on the logical partitions, and updating logical partition ranges mapped to the plurality of queues based on loads at the plurality of queues, in accordance with an embodiment of the present disclosure.

Various manners in which a processor 102 implemented on the apparatus 100 may operate are discussed in greater detail with respect to the method 300 depicted in FIG. 3. FIG. 3 depicts a flow diagram of a method for determining logical partitions 214 for event data 208 based on partition keys 212, storing the event data 208 in a plurality queues 210 based on the logical partitions 214, and updating logical partition ranges mapped to the plurality of queues 210 based on loads 226 at the plurality of queues 210, in accordance with an embodiment of the present disclosure. It should be understood that the method 300 depicted in FIG. 3 may include additional operations and that some of the operations described therein may be removed and/or modified without departing from the scope of the method 300. The description of the method 300 is made with reference to the features depicted in FIGS. 1 and 2 for purposes of illustration.

At block 302, the processor 102 may receive event data 208 to be placed in a plurality of queues 210. In some examples, the server 204 may maintain data sources (not shown) for the event data 208 and may receive the event data 208 from the data sources. The processor 102 may place the event data 208 in the plurality of queues 210, for instance, to be accessed by event readers (not shown).

At block 304, the processor 102 may identify partition keys 212 associated with the received event data 208. In some examples, the event data 208 may include the partition keys 212 in a field of the event data 208. By way of particular example, the processor 102 may apply a user ID stored in a user ID field in the event data 208 as the partition key 212.

At block 306, the processor 102 may determine logical partitions 214 for the received event data 208 based on the identified partition keys 212. In some examples, the processor 102 may calculate, for each of the event data 208, a hash of the partition keys 212 using a hash function. In addition, based on the calculated hash, the processor 102 may determine the respective logical partitions 214 for the received event data 208. In some examples, based on the calculated hashes, the processor 102 may evenly distribute the event data 208 across the logical partitions 214, for instance, by applying a modulus function to the number of available logical partitions 214.

At block 308, the processor 102 may store the received event data 208 in the plurality of queues 210 based on the determined logical partitions 214. In some examples, the logical partition ranges 216, 218 of the determined logical partitions 214 may be mapped to a respective one of the plurality of queues 210. For instance, a first logical partition range 216 may be mapped to the first queue 220, a second logical partition range 218 may be mapped to the second queue 222, and so forth.

At block 310, based on a load 226 at each of the plurality of queues 210, the processor 102 may update a mapping of the determined logical partitions 214 to at least one of the plurality of queues 210 to increase a balance of the load across the plurality of queues 210. For instance, the processor 102 may execute a mapping update by transferring the mapping of at least one of the determined logical partitions 214 from the first queue 220 to a second queue 222, which may reduce a number of logical partitions 214 correlated to the first logical partition range 216.

In some examples, a number of the determined logical partitions 214 may be set to be greater than a number of the plurality of queues 210, which may enable a relatively higher level of granularity of the logical partitions 214 that may be mapped to a certain one of the plurality of queues 210. In some examples, the number of the determined logical partitions 214 may be set to be proportional to or be less than a number of identified partition keys 212, which may avoid potential empty logical partitions 214.

In some examples, during an initialization stage, the processor 102 may evenly distribute the determined logical partitions 214 mapped to each of the plurality of queues 210. After the initialization stage, the processor 102 may iteratively update a mapping of the determined logical partitions 214 to the plurality of queues 210. For instance, the updated number of the determined logical partitions 214 correlated to the first logical partition range 216 may be used in a subsequent iterative update of the mapping for the first logical partition range 216.

In some examples, the processor 102 may determine a load 226 at the first queue 220 among the plurality of queues 210. The processor 102 may determine whether the load 226 at the first queue 220 is greater than a predefined threshold value. Based on a determination that the load 226 at the first queue 220 is greater than the predefined threshold value, the processor 102 may decrease the number of logical partitions 214 mapped to the first queue 220. Based on a determination that the load 226 at the first queue 220 is less than a second predefined threshold value, the processor 102 may increase the number of logical partitions 214 mapped to the first queue 220.

In some examples, the processor 102 may determine the load 226 at the first queue 220 based on a metric 228 correlated to the first queue 220. In some examples, the predefined set of metrics 228 may include an event ingress rate, a bytes ingress rate, an average de-queue time, and/or the like. The event ingress rate may represent a total number of events written to a certain queue per second. In some examples, the period for the event ingress rate may be configurable. The bytes ingress rate may represent a data size for events written to a certain queue per second. The average de-queue time may represent a rate of reading data from a certain queue. In some examples, the average de-queue time may be an average amount of time for a reader instance to pull an event from a certain queue.

In some examples, the processor 102 transfer a certain number of logical partitions 214 from the first queue 220 to another queue 210 among the plurality of queues 210, such as the second queue 222. In this example, the second queue 222 may have a load 226 that may be less than the second predefined threshold value.

Some or all of the operations set forth in the method 300 may be included as utilities, programs, or subprograms, in any desired computer accessible medium. In addition, the method 300 may be embodied by computer programs, which may exist in a variety of forms both active and inactive. For example, they may exist as machine-readable instructions, including source code, object code, executable code or other formats. Any of the above may be embodied on a non-transitory computer-readable storage medium.

Examples of non-transitory computer-readable storage media include computer system RAM, ROM, EPROM, EEPROM, and magnetic or optical disks or tapes. It is therefore to be understood that any electronic device capable of executing the above-described functions may perform those functions enumerated above.

Figure 4:
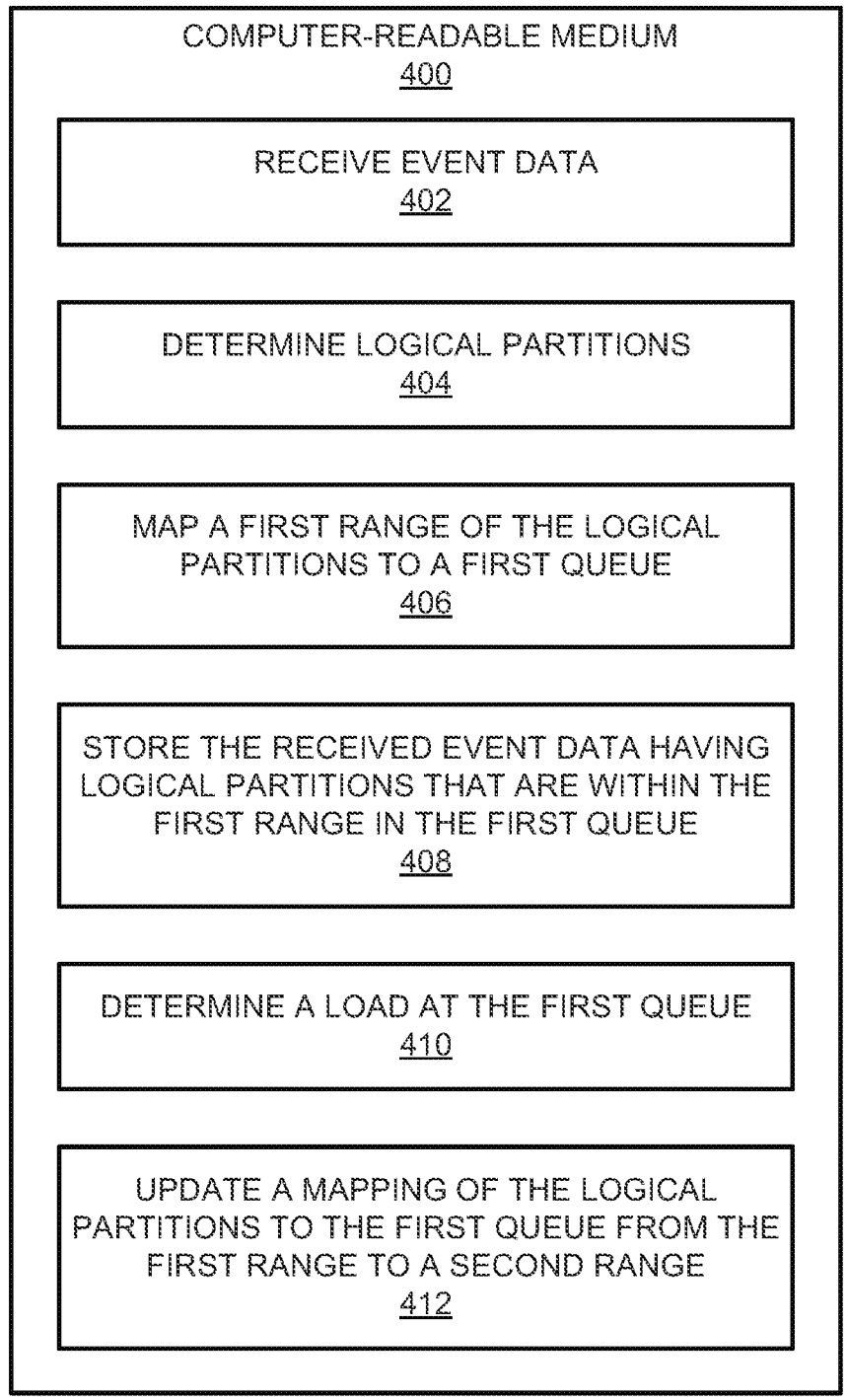
FIG. 4 depicts a block diagram of a computer-readable medium that may have stored thereon computer-readable instructions to determine logical partitions for event data, map a first range of the logical partitions to a first queue, and update a mapping of the logical partitions to the first queue from the first range to a second range based on a load at the first queue, in accordance with an embodiment of the present disclosure.

Turning now to FIG. 4, there is shown a block diagram of a computer-readable medium 400 that may have stored thereon computer-readable instructions to determine logical partitions 214 for event data 208, map a first range of the logical partitions 214 to a first queue 220, and update a mapping of the logical partitions 214 to the first queue 220 from the first range to a second range based on a load 226 at the first queue 220, in accordance with an embodiment of the present disclosure. It should be understood that the computer-readable medium 400 depicted in FIG. 4 may include additional instructions and that some of the instructions described herein may be removed and/or modified without departing from the scope of the computer-readable medium 400 disclosed herein. The description of the computer-readable medium 400 is made with reference to the features depicted in FIGS. 1, 2, and 3 for purposes of illustration. The computer-readable medium 400 may be a non-transitory computer-readable medium. The term "non-transitory" does not encompass transitory propagating signals.

The computer-readable medium 400 may have stored thereon machine-readable instructions 402-410 that a processor disposed in an apparatus 100 may execute. The computer-readable medium 400 may be an electronic, magnetic, optical, or other physical storage device that contains or stores executable instructions. The computer-readable medium 400 may be, for example, Random Access memory (RAM), an Electrically Erasable Programmable Read-Only Memory (EEPROM), a storage device, an optical disc, and the like.

The processor may fetch, decode, and execute the instructions 402 to receive event data 208 to be placed in a plurality of queues 210. In some examples, the server 204 may maintain data sources (not shown) for the event data 208 and may receive the event data 208 from the data sources. The data sources may be cloud-based data warehouses, data centers, and/or the like, which the server 204 or multiple servers 204 may access. The processor may place the event data 208 in the plurality of queues 210, for instance, to be accessed by event readers (not shown).

The processor may fetch, decode, and execute the instructions 404 to determine logical partitions 214 for the received event data 208. In some examples, the processor may calculate, for each of the event data 208, a hash of partition keys 212 using a hash function. Based on the calculated hash, the processor may determine the respective logical partitions 214 for the received event data 208. In some examples, based on the calculated hash, the processor 102 may evenly distribute the event data 208 across the logical partitions 214.

The processor may fetch, decode, and execute the instructions 406 to map each of a plurality of ranges of the determined logical partitions 214 to a respective queue of a plurality of queues 210. For instance, the processor may map a first range of the determined logical partitions 214, such as the first logical partition range 216 depicted in FIG. 2, to a first queue 220 among the plurality of queues 210. The processor may store the mapping information for the first logical partition range 216 and the first queue 220 in the mapping data 224.

The processor may fetch, decode, and execute the instructions 408 to store the received event data 208 having logical partitions 214 that are within certain ranges 216, 218 in the respective queues 220, 222 among the plurality of queues 210. For instance, the processor may store the received event data 208 having logical partitions 214 that are within the first logical partition range 216 in the first queue 220.

The processor may fetch, decode, and execute the instructions 410 to determine the loads 226 at each of the plurality of queues 210. For instance, the processor may determine a load 226 at the first queue 220. The processor may determine the load 226 at the first queue 220 based on metrics 228 correlated to the first queue 220.

The processor may fetch, decode, and execute the instructions 412 to update a mapping of the determined logical partitions 214 to the first queue 220 from the first logical partition range 216 to a second range of the determined logical partitions 214, such as the second logical partition range 218 depicted in FIG. 2. The processor may update the mapping of the determined logical partitions 214 to the first queue 220 by transferring the mapping of at least one of the determined logical partitions 214 from the first queue 220 to another queue 210 of the plurality of queues 210, to increase a balance of the loads 226 across the plurality of queues 210.

In some examples, the processor may update the mapping of the determined logical partitions 214 for the first queue 220 based on a determination that the load 226 at the first queue 220 is greater than a predefined threshold value. In some examples, the processor may identify a second queue 222 among the plurality of queues 210 as the destination queue 210, for instance, as a queue 210 having a load 226 that is less than a second predefined threshold value. In some examples, the second logical partition range 218 for the second queue 222 may be correlated to a lower number of the determined logical partitions 214 than the first logical partition range 216, for instance at the initialization stage when the determined logical partitions 214 are evenly allocated to the plurality of queues 210.

In this instance, based on the determination that the load 226 at the first queue 220 is greater than the predefined threshold value, the processor may transfer the mapping of at least one of the determined logical partitions 214 from the first queue 220 to the second queue 222. In some examples, the processor may iteratively update the mapping of the determined logical partitions 214 to the first queue 220, for instance, based on expiration of a predefined period of time, according to a certain schedule, based on the occurrence of certain events, and/or the like.

In some examples, the processor may identify partition keys 212 in respective fields of the received event data 208. The processor may determine the logical partitions 214 for the received event data 208 based on the identified partition keys 212. In some examples, a number of the determined logical partitions 214 may be greater than a number of the plurality of queues 210, and the number of the determined logical partitions 214 may be proportional to or less than a number of the identified partition keys 212.

Although described specifically throughout the entirety of the instant disclosure, representative examples of the present disclosure have utility over a wide range of applications, and the above discussion is not intended and should not be construed to be limiting, but is offered as an illustrative discussion of aspects of the disclosure.

What has been described and illustrated herein is an example of the disclosure along with some of its variations. The terms, descriptions and figures used herein are set forth by way of illustration and are not meant as limitations. Many variations are possible within the scope of the disclosure, which is intended to be defined by the following claims—and their equivalents—in which all terms are meant in their broadest reasonable sense unless otherwise indicated.

What is claimed is:

1. An apparatus comprising:
a processor; and
a memory on which is stored machine-readable instructions that when executed by the processor, cause the processor to:
receive event data to be placed in a plurality of queues;
determine logical partitions for the received event data;
store the event data in the plurality of queues based on the determined logical partitions, a first logical partition range being mapped to a first queue of the plurality of queues and a second logical partition range being mapped to a second queue of the plurality of queues;
determine respective loads at the plurality of queues in real-time; and
based on the respective loads at the plurality of queues, update a mapping of the determined logical partitions to the plurality of queues, wherein:
a respective determined logical partition is mapped to a respective queue of the plurality of queues; and
updating the mapping of the determined logical partitions to the plurality of queues comprises updating the mapping of at least one of the determined logical partitions from the first queue to the second queue to increase a balance of the respective loads across the plurality of queues based on a calculated probability of a respective determined logical partition to be transferred to another queue of the plurality of queues.

2. The apparatus of claim 1, wherein the first logical partition range is correlated to a first number of the determined logical partitions assigned to the first queue, and the second logical partition range is correlated to a second number of the determined logical partitions assigned to the second queue, the first number of the determined logical partitions being different than the second number of the determined logical partitions.

3. The apparatus of claim 1, wherein the instructions further cause the processor to:
identify partition keys in respective fields of the received event data; and
determine the logical partitions for the received event data based on the identified partition keys.

4. The apparatus of claim 3, wherein a number of the determined logical partitions is greater than a number of the plurality of queues, and the number of the determined logical partitions is proportional to a number of the identified partition keys.

5. The apparatus of claim 1, wherein the instructions further cause the processor to:
initially set the first logical partition range and the second logical partition range to comprise the same number of logical partitions with respect to each other during an initialization stage to evenly distribute the mapping of the determined logical partitions across the plurality of queues.

6. The apparatus of claim 1, wherein the instructions further cause the processor to:
iteratively update the mapping of the determined logical partitions to the plurality of queues until a convergence is reached in which the respective loads at the plurality of queues are balanced.

7. The apparatus of claim 1, wherein the instructions further cause the processor to:
determine a load at the first queue;
based on a determination that the load at the first queue is greater than a predefined threshold value, update the mapping of the determined logical partitions for the first queue to decrease a number of the determined logical partitions mapped to the first queue; and
based on a determination that the load at the first queue is less than a second predefined threshold value, update the mapping of the determined logical partitions for the first queue to increase the number of the determined logical partitions mapped to the first queue.

8. The apparatus of claim 7, wherein the instructions further cause the processor to:
determine the load at the first queue based on a metric correlated to the first queue, the metric including a number of events written per second, a data size for events written per second, a rate of reading data from the first queue, or a combination thereof.

9. The apparatus of claim 7, wherein the instructions further cause the processor to:
based on a determination that the load at the first queue is greater than the predefined threshold value, transfer the mapping of a certain number of the determined logical partitions from the first queue to the second queue of the plurality of queues that has a load that is less than the second predefined threshold value.

10. A method comprising:
receiving, by a processor, a plurality of event data to be placed in a plurality of queues;
identifying, by the processor, partition keys associated with the received event data;
determining, by the processor and for each of the event data, a logical partition for the event data based on the identified partition key associated with the event data;
storing, by the processor, the received event data in the plurality of queues based on the determined logical partitions for the event data, each of the logical partition ranges being mapped to one of the plurality of queues; and based on loads at the plurality of queues, updating, by the processor, a mapping of at least one of the logical partition ranges to at least one of the plurality of queues to increase a balance of the loads across the plurality of queues based on a calculated probability of a respective determined logical partition to be transferred to another queue within the plurality of queues.

11. The method of claim 10, wherein a number of the determined logical partitions is greater than a number of the plurality of queues, and the number of the determined logical partitions is proportional to a number of the identified partition keys.

12. The method of claim 10, further comprising:
initially setting the logical partition ranges to comprise the same number of logical partitions with respect to each other during an initialization stage to evenly distributing the mapping of the determined logical partitions across the plurality of queues.

13. The method of claim 10, further comprising:
iteratively updating the mapping of the determined logical partitions to the plurality of queues until a convergence is reached in which the respective loads at the plurality of queues are balanced.

14. The method of claim 10, further comprising:
determining a load at a first queue among the plurality of queues;
determining whether the load at the first queue is greater than a predefined threshold value;
based on a determination that the load at the first queue is greater than the predefined threshold value, decreasing the number of the determined logical partitions mapped to the first queue; and
based on a determination that the load at the first queue is less than a second predefined threshold value, increasing the number of the determined logical partitions mapped to the first queue.

15. The method of claim 14, further comprising:
determining the load at the first queue based on a metric correlated to the first queue, the metric including a number of events written per second, a data size for events written per second, a rate of reading data from the first queue, or a combination thereof.

16. The method of claim 14, further comprising:
based on a determination that the load at the first queue is greater than the predefined threshold value, transferring the mapping of a certain number of the determined logical partitions from the first queue to a second queue among the plurality of queues that has a load that is less than the second predefined threshold value.

17. A non-transitory computer-readable medium on which is stored computer-readable instructions that, when executed by a processor, cause the processor to:
receive event data to be placed in a plurality of queues;
determine logical partitions for the received event data;
map a first range of the determined logical partitions to a first queue among the plurality of queues;
store the received event data having logical partitions that are within the first range in the first queue;
determine a load at the first queue; and
based on a determination that the load at the first queue is greater than a predefined threshold value, update a mapping of the determined logical partitions to the first queue from the first range to a second range of the determined logical partitions based on a calculated probability that at least a subset of the determined logical partitions within the first range is to be transferred to another queue of the plurality of queues.

18. The non-transitory computer-readable medium of claim 17, wherein the instructions cause the processor to:
identify partition keys in respective fields of the received event data; and
determine the logical partitions for the received event data based on the identified partition keys,
wherein a number of the determined logical partitions is greater than a number of the plurality of queues, and the number of the determined logical partitions is proportional to a number of the identified partition keys.

19. The non-transitory computer-readable medium of claim 17, wherein the instructions cause the processor to:
iteratively update the mapping of logical partition ranges associated with the determined logical partitions to the first queue.

20. The non-transitory computer-readable medium of claim 17, wherein the instructions cause the processor to:
determine a second queue among the plurality of queues that has a load that is less than a second predefined threshold value that is lower than the predefined threshold value; and
based on a determination that the load at the first queue is greater than the predefined threshold value, transfer the mapping of at least one of the determined logical partitions from the first queue to the second queue.

* * * * *